(12) United States Patent
Christiansen (10) Patent No.: US 12,130,211 B2
(45) Date of Patent: Oct. 29, 2024

(54) EXCITER DEVICE AND METHOD FOR FATIGUE TESTING OF A BLADE OF A WIND TURBINE

(71) Applicant: Siemens Gamesa Renewable Energy A/S, Brande (DK)

(72) Inventor: Soeren Christiansen, Støvring (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 420 days.

(21) Appl. No.: 17/603,364

(22) PCT Filed: Mar. 23, 2020

(86) PCT No.: PCT/EP2020/058033
§ 371 (c)(1),
(2) Date: Oct. 13, 2021

(87) PCT Pub. No.: WO2020/216545
PCT Pub. Date: Oct. 29, 2020

(65) Prior Publication Data
US 2022/0187157 A1   Jun. 16, 2022

(30) Foreign Application Priority Data

Apr. 23, 2019  (EP) ..................................... 19170508

(51) Int. Cl.
*G01M 7/02* (2006.01)
*G01M 7/04* (2006.01)

(52) U.S. Cl.
CPC ............ *G01M 7/022* (2013.01); *G01M 7/025* (2013.01); *G01M 7/027* (2013.01); *G01M 7/04* (2013.01)

(58) Field of Classification Search
CPC ...... G01M 7/022; G01M 7/025; G01M 7/027; G01M 7/04
See application file for complete search history.

(56) References Cited

U.S. PATENT DOCUMENTS 8,601,878 B2 * 12/2013 Cotrell .................... F03D 17/00
                                                              73/806
8,621,934 B2 *  1/2014 Hughes ................... G01M 7/06
                                                              73/808

(Continued)

FOREIGN PATENT DOCUMENTS

CN          203824721 U    9/2014
CN          203824722 U    9/2014

(Continued)

OTHER PUBLICATIONS

PCT International Search Report & Written Opinion mailed Jul. 17, 2020 corresponding to PCT International Application No. PCT/EP2020/059331 filed Feb. 4, 2020.

*Primary Examiner* — Freddie Kirkland, III
(74) *Attorney, Agent, or Firm* — Schmeiser, Olsen & Watts LLP (57) ABSTRACT

Provided is an exciter device for fatigue testing of a blade of a wind turbine, including a actuator for generating a periodic excitation force and a coupling device for coupling the actuator to a blade to be tested. The exciter device includes a pretensioning device applying a pretension such that the excitation force only acts in a pulling or pushing direction over the whole period.

15 Claims, 5 Drawing Sheets

(56) References Cited

U.S. PATENT DOCUMENTS

| | | | | |
|---|---|---|---|---|
| 8,650,970 B2* | 2/2014 | Guy | ........................ | G01M 7/04 |
| | | | | 73/862.381 |
| 8,677,827 B2* | 3/2014 | Cotrell | .................... | G01M 7/06 |
| | | | | 73/649 |
| 10,209,160 B2* | 2/2019 | Richards | ............. | G01M 5/0066 |
| 11,579,039 B2* | 2/2023 | Richards | ............. | G01M 5/0016 |
| 11,754,053 B2* | 9/2023 | Christiansen | ......... | G01M 7/027 |
| | | | | 416/61 |
| 11,885,299 B2* | 1/2024 | Batge | ...................... | G01M 7/06 |
| 2010/0263448 A1 | 10/2010 | Hughes et al. | | |
| 2011/0041617 A1* | 2/2011 | Cotrell | .................... | F03D 17/00 |
| | | | | 73/660 |
| 2011/0179884 A1* | 7/2011 | Guy | ........................ | G01M 7/04 |
| | | | | 73/862.381 |
| 2012/0152023 A1* | 6/2012 | Smith | .................... | G01M 7/027 |
| | | | | 73/649 |
| 2013/0061683 A1 | 3/2013 | Baker et al. | | |
| 2016/0109319 A1 | 4/2016 | Lee et al. | | |
| 2017/0241860 A1 | 8/2017 | Richards et al. | | |
| 2021/0341357 A1* | 11/2021 | Yang | ....................... | F01D 5/288 |
| 2022/0010780 A1* | 1/2022 | Batge | .................. | G01M 5/0058 |
| 2022/0381640 A1* | 12/2022 | Christiansen | ....... | G01M 5/0016 |
| 2023/0060931 A1* | 3/2023 | Rosemeier | .............. | G01M 7/04 |

FOREIGN PATENT DOCUMENTS

| | | | | |
|---|---|---|---|---|
| CN | 105527064 A | | 4/2016 | |
| CN | 107110736 A | | 8/2017 | |
| DE | 102012205153 A1 | * | 10/2013 | ......... G01M 5/0016 |
| DE | 102012025649 A1 | | 8/2015 | |
| DE | 102016005586 A1 | | 11/2017 | |
| EP | 2741069 A1 | * | 6/2014 | ......... G01M 5/0016 |
| WO | 2008145727 A1 | | 12/2008 | |

* cited by examiner

EXCITER DEVICE AND METHOD FOR FATIGUE TESTING OF A BLADE OF A WIND TURBINE

CROSS-REFERENCE TO RELATED APPLICATIONS

This application claims priority to PCT Application No. PCT/EP2020/058033, having a filing date of Mar. 23, 2020, which claims priority to EP Application No. 19170508.6, having a filing date of Apr. 23, 2019, the entire contents both of which are hereby incorporated by reference.

FIELD OF TECHNOLOGY

The following concerns an exciter device for fatigue testing of a blade of a wind turbine, comprising an actuator, in particular a motor, for generating a periodic excitation force and a coupling device for coupling the motor to a blade to be tested. The following further concerns a method for fatigue testing of a blade of a wind turbine, wherein a periodic excitation force is generated by an actuator, in particular a motor, and applied to the blade by the coupling device for coupling the actuator to the blade.

BACKGROUND

Blades used in wind turbines are required to withstand varying, strong forces over a long time period. Thus, comprehensive testing regarding the mechanical properties of the blade, in particular fatigue, is performed. In particular, an exciter device is coupled to the blade such that an excitation force generated by the actuator, in particular the motor, acts on a blade to be tested.

The purpose of such an exciter device may, for example, be to apply a sinusoidal excitation force on the blade with a frequency near or corresponding to the blade's eigenfrequency (taking into account the effects of exciter itself), using, for example, several million cycles. The position along the length of the blade where the excitation force acts may be suitably chosen. During such a fatigue test, which may take a long time to perform, for example up to a few months, the tip of the blade may oscillate over several meters.

A known exciter device for a blade comprises a servo motor and a coupling device, wherein the coupling device may comprise a gearbox, an exciter arm and a pushrod. Such an exciter device is for example described in http://www.b-laest.com/news-2/176-blaest-developed-a-new-electro-mechanical-exciter-for-fatigue-testing. In this exciter device, the electrical motor applies a reversing torque onto the input shaft of the gearbox, which converts the low torque and high speed from the input shaft into high torque and low speed on the output shaft. A torque arm is clamped to the output shaft, moving up and down by, for example, 30°. By flexible connections, such as swivel bearings, a push-pull rod is connected between the torque arm and the blade and thereby able to transfer the excitation force from the exciter device to the blade.

However, several problems exist when using such an exciter device. A first problem is wear. For each direction change between a pulling direction and a pushing direction, the teeth of the gear in the gearbox will change their engagement side, since the teeth have to interact with the previously opposite teeth. Since there is always some backlash in the gearbox, there will be movement and thus a characterizing clicking sound. These gearbox reversals will, over time, wear out the gearbox. Another problem regarding these gearbox reversals is that the sinusoidal force to be applied is noisy and will impact test quality and time.

Another problem is the cost of the exciting device. Not only is the servo motor used more expensive than a standard motor, but also the gearbox, exciter arm and pushrod are expensive. It is noted that a servo motor is used since the motor needs to have a low motor shaft inertia to reduce the above-mentioned teeth wear.

A third problem is the time needed for fatigue testing. In particular, the mass of the exciter arm and the pushrod and the geared motor shaft inertia have a significant impact on the test result. A flapwise blade test takes approximately three months to conduct, depending on the eigenfrequency. The more mass is added to the blade the more time it will take to test the blade. Since the eigenfrequency is the square root of the equivalent stiffness of the blade divided by the equivalent mass of the blade, test duration may rise significantly when adding additional mass.

Finally, the moment distribution along the blade is also affected based on any additional masses, which cause the blade to bend in different ways. During the blade fatigue test, hard constraints to the bending exist for each, for example, half meter along the blade, which must be complied with. If too much mass is added by the exciter device, this may result in overtesting of certain areas of the blade.

In summary, the existing excitation method requires an expensive gear and motor type as well as a heavy arm and pushrod. Furthermore, noise from the gearbox reversals wears the gears and secondly causes a noisy excitation force input to the blade. Finally, the heavy arm/pushrod and geared motor shaft prolong the test time and cause potential overtesting.

SUMMARY

An aspect relates to an improved exciter device, in particular being less subject to wear, producing a less noisy excitation force and adding less mass to the blade.

In an exciter device as initially described, according to embodiments of the invention, the exciter device comprises a pretensioning device applying a pretension such that the excitation force only acts in a pulling or pushing direction over the whole period.

The pretension can be understood as an offset for the periodic excitation force, such that the periodic excitation force never changes sign. In particular, the periodic, sinusoidal excitation force may only act in a pulling direction, since any mass added to the blade will also act in this direction, such that, in some cases, less pretension may be applied.

An idea of embodiments of the current invention is thus that the excitation force acting on the blade does not change sign, for example, is always positive. This is a fundamentally new approach on how fatigue testing excitation should work, since known approaches always assumed that, to successfully excite a blade, it would be required to both push and pull. However, the main purpose is to apply a sinusoidal force to the blade. This can also be achieved in embodiments of the current invention, using the offset provided by the pretension. In this manner, if a gearbox is used, gearbox reversals may be avoided, thus also reducing the detrimental effects discusses above. Additionally, however, the concept of only having the excitation force act in one direction and not changing sign allows for new designs of exciter devices, as laid out in detail below.

Generally, in many embodiments, the exciter device further comprises a control device, the control device being configured to control the actuator, in particular the motor, to generate the periodic excitation force for the blade having a predetermined frequency, in particular calculated from an eigenfrequency of the blade and/or depending on a coupling point of the blade. Often, the exciter device will also comprise a load cell providing measurement data on the excitation force actually exerted. In this manner, feedback control may be executed by the control device, since the measurement data are provided to the control device. As an alternative to the load cell, of course, also other force measurement devices may be employed.

In an embodiment, the coupling device may comprise a gearbox. For example, the already known design, wherein the coupling device additionally comprises an exciter arm (torque arm) and a pushrod may be used. The aim of embodiments of the current invention in this case is to prevent gearbox reversals of the gearbox connected to the motor shaft as input shaft. The pretensioning device acts on the motor shaft and applies a pretension such that no gear reversals appear. That is, during the generation of the periodic excitation force, the teeth of the gears of the gearbox remain engaged, never coming in contact with the opposite teeth. In this manner, wear of the gearbox and noisiness of the excitation force can be greatly reduced.

In the embodiment having a gearbox, since the pretension is applied to the motor shaft, the pretension device may comprise the motor itself, applying at least a part of the pretension, in particular using the control device to accordingly control the motor. However, pretension may also, at least in part, be applied by a separate member of the pretension device, for example a spring or a piston.

However, in an embodiment of the current invention, the coupling device comprises,
- a transfer device for mounting to the blade to transfer the excitation force to the blade,
- a pulley mounted to a actuator shaft of the actuator, and
- a flexible coupling element for coupling the pulley to the transfer device, the pulley being configured to wind the wire to transfer the excitation force,
- wherein the coupling element is pretensioned by the pretensioning device.

The basic idea of embodiments of the current invention, that is, to provide an excitation force, in particular a sinusoidal excitation force, never changing sign, which therefore is applied only in a pushing or, preferably, pulling direction, can be exploited to provide a completely new design of an exciter device for fatigue testing. In this design, instead of the gearbox, a pulley is used, wherein the diameter of the pulley is chosen to obtain a certain winding speed (meters/second) at a nominal rotation speed (rpm). Since the force only acts in one direction, in this case the pulling direction, a flexible coupling element may be used to couple the pulley to the blade.

The flexible coupling element may, in particular, be wire-like or belt-like. That is, the flexible coupling element is elongated, at least essentially inelastic in its longitudinal direction and flexible perpendicular to the longitudinal direction. In particular, the coupling element may be chosen from the group comprising a steel wire, a rope, a belt and a fiber.

The coupling element is fixed to the pulley, wherein the pulley may have a track for the coupling element or each coupling element fixed to it. The coupling element is also attached to the transfer device, completing the coupling. In preferred embodiments, the pulley may be placed below the contact point on the blade, however, additional pulleys may be used to redirect the flexible coupling element, in particular to direct the excitation force such that it acts vertically on the blade in the pulling direction. In operation, due to the coupling element being fixed to the pulley, the periodic torque of the actuator results in repeatedly winding and unwinding the flexible coupling element to and from the pulley. Since the flexible coupling element (and thus the pulley and actuator shaft, in particular motor shaft) are pretensioned by virtue of the pretensioning device, each rotating movement of the pulley and thus each winding of the coupling device results in a change in the (pulling) excitation force exerted on the blade.

This design of the exciter device may shortly be described as being an exciter device for fatigue testing of a blade of a wind turbine, comprising an actuator, in particular a motor, for generating a periodic excitation force and a coupling device for coupling the actuator to a blade to be tested, which is characterized in that the coupling device comprises a transfer device for mounting to the blade to transfer the excitation force to the blade, a pulley mounted to a actuator shaft of the actuator, and a flexible coupling element for coupling the pulley to the transfer device, the pulley being configured to wind the wire to transfer the excitation force, wherein the coupling element is pretensioned by a pretensioning device.

The advantages of the concrete construction using a pulley are, firstly, that no gearbox is needed, such that no gearbox reversals occur anyway. The wear is thus reduced to the wear of the at least one pulley and coupling element. Additionally, by removing the exciter arm, the pushrod and the geared motor shaft inertia, the equivalent mass is reduced, such that the eigenfrequency of the arrangement is increased and time for fatigue testing can be reduced. Thirdly, the quality of the fatigue test is improved since the exciter device does not introduce a large mass and inertia at a single point.

In an embodiment, the motor may be a three-phase induction motor. That is, embodiments of the invention allow for the use of a cheap, standard three-phase induction motor instead of servo motor, such that the cost of the exciter device may be further reduced.

In a concrete embodiment, the pretension device may comprise a spring or a mass or a piston, wherein the pretension is applied by using a flexible pretensioning element fixed to the pulley. The flexible pretensioning element, which is an additional flexible coupling element, may also be, as described with respect to the flexible coupling element, wire-like or belt-like, and is also fixed to the pulley, such that, due to the attachment to the spring, mass or piston, a pretensioning force acts on the pulley, also tensioning the flexible coupling element. In particular, the spring may be attached to the pretensioning element and a counter-bearing, for example a concrete block or the like, such that pretension is applied to the pulley and thus to the actuator shaft and the coupling element. If a mass is used, the freely suspended mass may be attached to the pretensioning element, such that gravity provides the pretensioning force. It is noted that the counter-bearing may, of course, comprise a part of the pretensioning element if, for example, a spring is integrated into the pretensioning element.

In an especially preferred design, the counter-bearing may comprise the coupling element and/or an attachment means for the coupling element and/or the transfer device is used as the counter-bearing. In this manner, a very compact exciter device results, such that less room is needed. In essence, in this embodiment, the blade itself provides the main mass for the counter-bearing.

Alternatively or additionally, the pretensioning device may comprise the actuator applying at least a part of the pretension, in particular using the control device to accordingly control the actuator. In this case, if the actuator applies the whole pretension, no additional members for the pretensioning device are required, also allowing for a very compact design. The pretension may, for example, be realized by adding an offset to the control of the actuator.

The transfer device may comprise, as already known from the state of the art, a yoke. However, in an embodiment, the transfer device may also comprise a sling to be slung around the blade, since, in this embodiment, the excitation force only acts as a pulling force. The usage of a sling further reduces mass, complexity and cost. The sling may, comparable to the flexible coupling element and the flexible pretensioning element, be made of a wire, in particular a steel wire, a rope, a belt or a fiber material.

The coupling element may be attached to the transfer device by an attachment means, comprising at least one through-hole for fixing the coupling element. Preferably, if the transfer device comprises a sling as described above, the attachment means may comprise an additional through-hole for the sling.

As has already been discussed, the exciter device may comprise a load cell, in particular connected to the control device. The control device may use the measurement data for feedback control.

In an embodiment, the load cell may be comprised by the attachment means. The position of the attachment means is an ideal spot for providing a force measurement to be used in controlling the exciter device. Thus, the load cell may be integrated into the attachment means or even for the attachment means.

Embodiments of the invention further concern a method for fatigue testing of a blade of a wind turbine, wherein a periodic excitation force is generated by an actuator, in particular a motor, and applied to the blade by a coupling device for coupling the actuator to the blade, wherein a pretension is applied to the blade such that the excitation force only acts in pulling or pushing direction over the whole period of the periodic excitation force. All features and remarks regarding the exciter device according to embodiments of the invention also apply to the method according to embodiments of the invention, such that the same advantages are achieved. In particular, an exciter device according to embodiments of the invention is used in the method according to embodiments of the invention.

BRIEF DESCRIPTION

Some of the embodiments will be described in detail, with references to the following Figures, wherein like designations denote like members, wherein.

DETAILED DESCRIPTION

Figure 1:
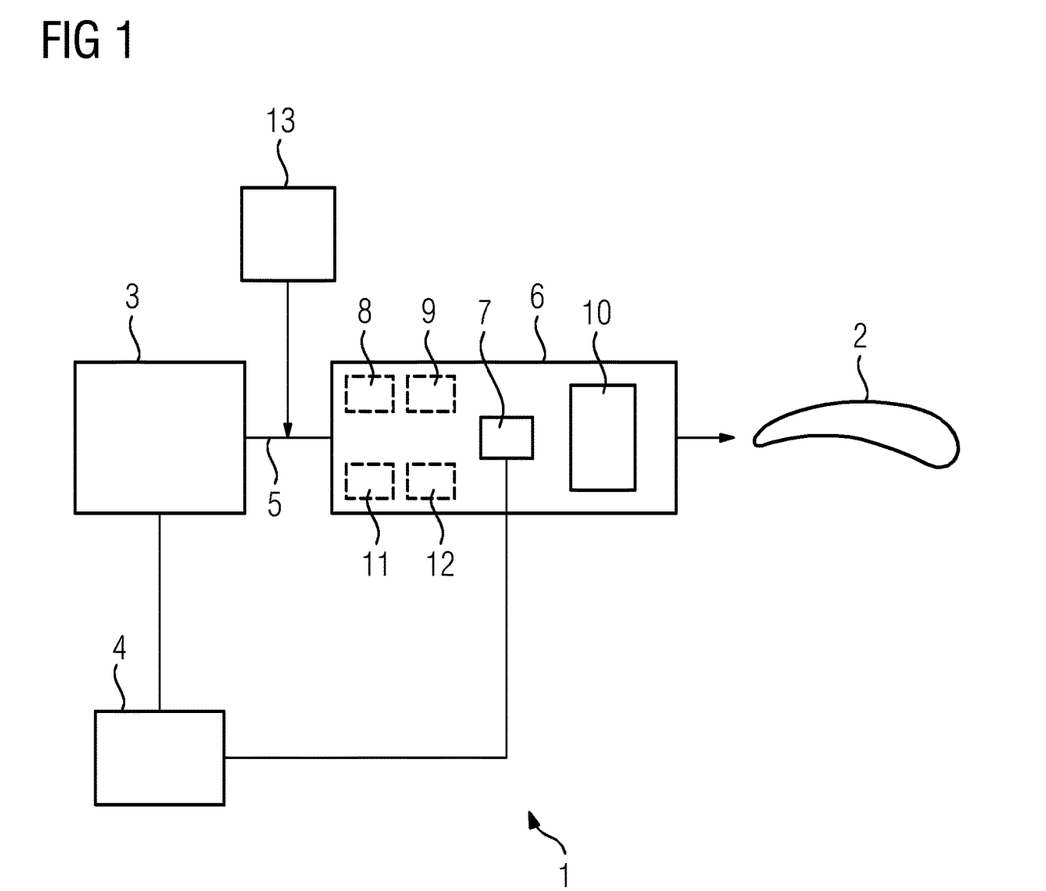
FIG. 1 shows a principle drawing of an exciter device.

FIG. 1 shows the general structure of an exciter device 1 according to embodiments of the current invention. The exciter device 1 is to be used for fatigue testing a blade 2 by exerting a periodic, in this case sinusoidal, excitation force on the blade at a certain position along the blade 2. To generate this excitation force, the exciter device 1 generally comprises as an actuator a motor 3, in this case a three-phase induction motor, which is controlled by a control device 4. The motor 3, outputting a certain torque at a motor shaft 5, is coupled to the blade 2 using a coupling device generally indicated at 6. The coupling device 6 generally comprises at least one load cell 7 measuring the actual excitation force, wherein the corresponding measurement data is applied to the control device 4, enabling feedback control.

Since the motor 3 outputs a relatively low torque at relatively high rotation speed (rpm), this output is to be converted to a certain applied pulling speed/force on the blade by a conversion means. Regarding embodiments of the current invention, two options exist.

In a first embodiment, which is less preferred, a gearbox 8 is used, whose output shaft supplies a higher output torque to a mechanical arrangement 9 comprising an exciter arm and a pushrod (which, in this case, may be more suitably termed pullrod). The latter is attached to the blade 2 using a transfer device 10, in this less preferred embodiment a yoke or generally a clamp.

In a preferred second option, a pulley 11 is attached to the motor shaft 5, to which a flexible coupling element 12, for example a steel wire, a rope or a belt, is fixed. The other end of the flexible coupling element is attached to the transfer device 10 via an attachment means comprising the load cell 7.

Essential for the feasibility of the second option is a pretensioning device 13, which acts at least on the motor shaft 5, providing a pretension such that the excitation force only acts in a pulling direction over the whole period of the sinusoidal wave form. In other words, the pretension can be understood as an offset for the periodic excitation force, such that the periodic excitation force never changes sign.

Figure 2:
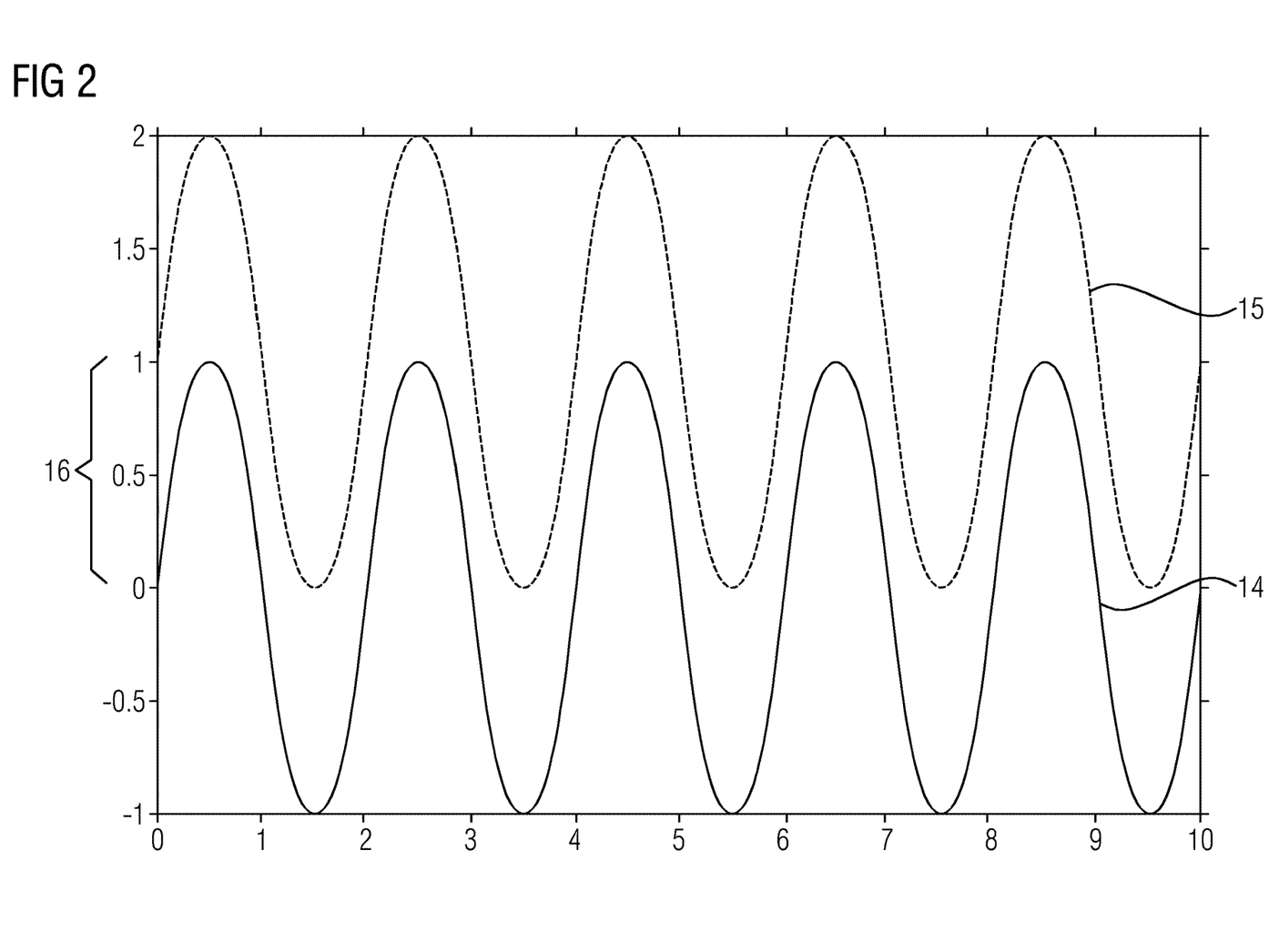
FIG. 2 is a graph showing a conventionally applied excitation force and an excitation force applied.

This is illustrated in the graph of FIG. 2, wherein the excitation force (in kN) is plotted against time. The curve 14 shows an excitation force generated by a conventional exciter device according to the state of the art. As can be seen, the sinusoidal excitation force oscillates essentially around zero, resulting in an alternating push-and-pull-operation on the blade. The curve 15, however, shows a sinusoidal excitation force generated by an exciter device 1 according to embodiments of the invention. As can be seen, the pretension provided by the pretensioning device 13 acts as an offset 16 such that the sign of the excitation force is always "plus", resulting in the excitation force only applying in the pulling direction. In this manner, when using a gearbox 8, no gearbox reversals occur, while, in preferred embodiment, when using the flexible coupling element 12 fixed to the pulley 11, this construction becomes feasible.

The following figures show concrete embodiments of an exciter device 1 according to the invention.

Figure 3:
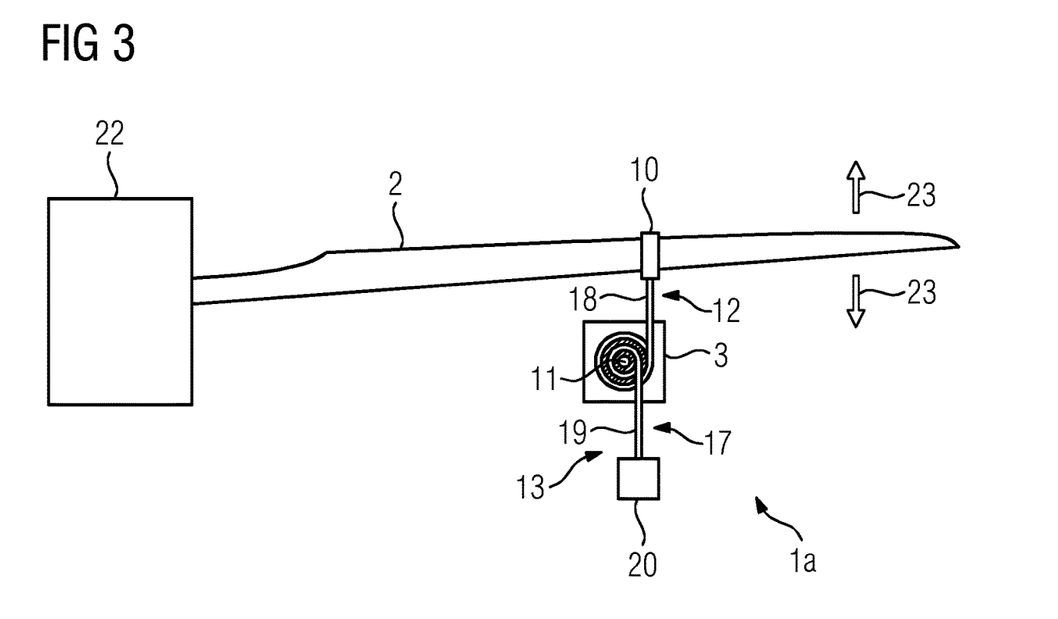
FIG. 3 shows a first embodiment of an exciter device.

FIG. 3 shows a first embodiment of an exciter device 1a. In this embodiment, and in the following embodiments, steel wires will be exemplarily used as the flexible coupling element 12 and the flexible pretensioning element 17, where applicable. As can be seen, in the first concrete embodiment, the steel wire 18 is fixed to the pulley 11 such that the reversingly operated motor 3 acts to wind and unwind the steel wire 18 from the pulley 11. The pretensioning device 13 comprises a freely suspended mass 20 fixed to another steel wire 19 acting as a flexible pretensioning element 17. The steel wire 19 is also fixed to the pulley 11, providing the pretension to the pulley 11, the motor shaft and the coupling element 12, that is, the steel wire 18, keeping it pretensioned. The pulley 11 may provide tracks for both steel wires 18, 19.

Figure 4:
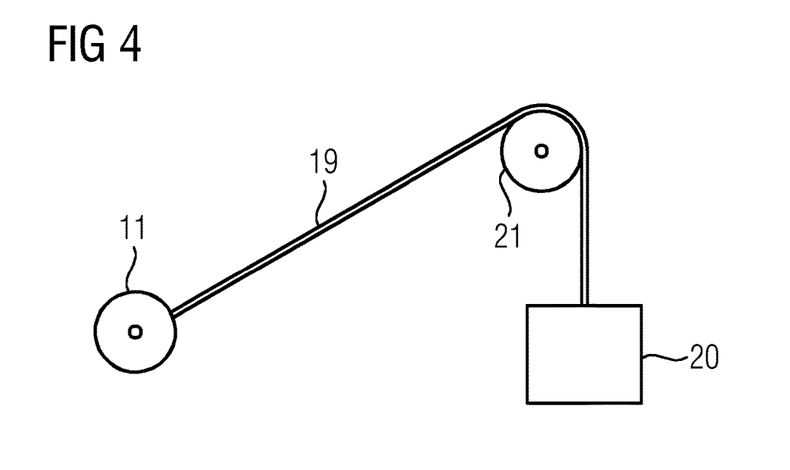
FIG. 4 shows a detail regarding the first embodiment.

FIG. 4 shows the use of an additional pulley 21 for the steel wire 19, for example, to place the freely suspended mass 20 horizontally beneath the motor 3.

Returning to FIG. 3, also the blade 2 to be tested is shown in greater extent. The blade root is securely fixed in a concrete block 22. The blade 2 is received by the transfer device 10 at a certain position, such that the exerted excitation force may cause the blade to oscillate as indicated by arrows 23.

Figure 5:
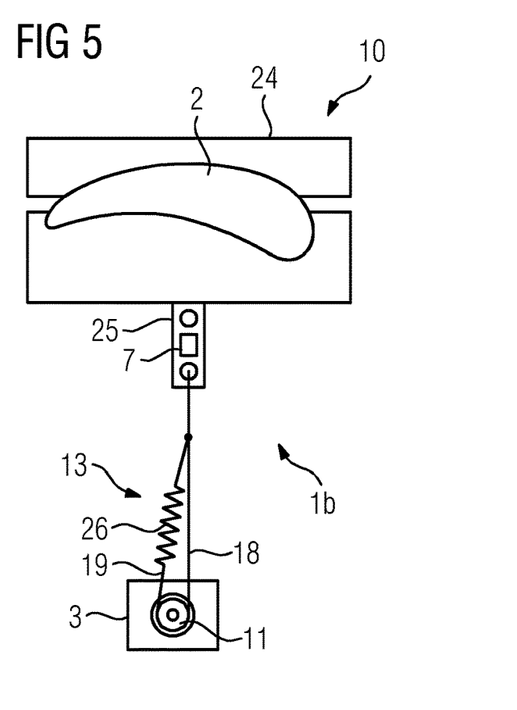
FIG. 5 shows a second embodiment of an exciter device.

FIG. 5 shows a second embodiment of an exciter device 1b according to the invention. In this case, the transfer device 10 comprises a wooden yoke 24 in which the blade 2 to be tested is received. The steel wire 18 acting as flexible coupling element 12 is attached to the yoke 24 by an attachment means 25 having a through-hole for attachment of the steel wire 18 and also comprising the load cell 7. Please note that the load cell 7 may be integrated into the attachment means 25 also in each of the other embodiments, although this will not be shown for reasons of clarity and comprehensibility.

The pretension device 13 in this embodiment comprises, again, a steel wire 19 as a pretensioning element, into which a spring 26 is integrated. The steel wire 19 is fixed to the steel wire 18 close to the attachment means 25, such that the pretensioning force results.

Figure 6:
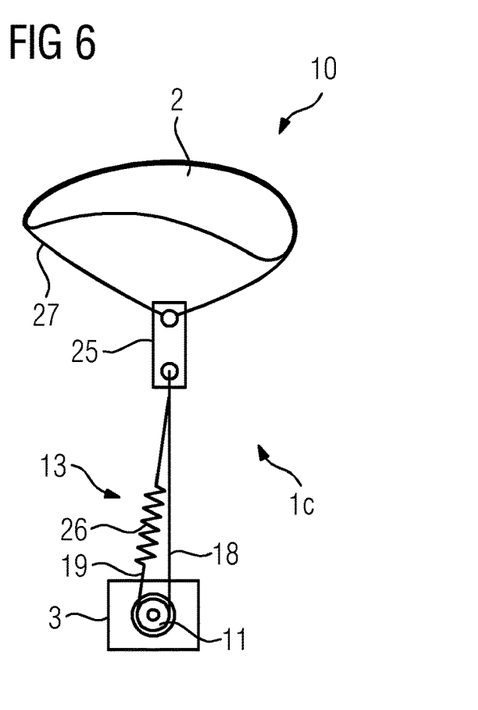
FIG. 6 shows a third embodiment of an exciter device.

FIG. 6 shows a third embodiment of an exciter device 1c according to the invention, which differs from the embodiment of FIG. 5 in that the transfer device 10 comprises a sling 27 slung around the blade 2. The sling 27 may, for example, pass through another through-hole of the attachment means 25. Additionally, the steel rope 19, in this case, is also fixed to the attachment means.

Figure 7:
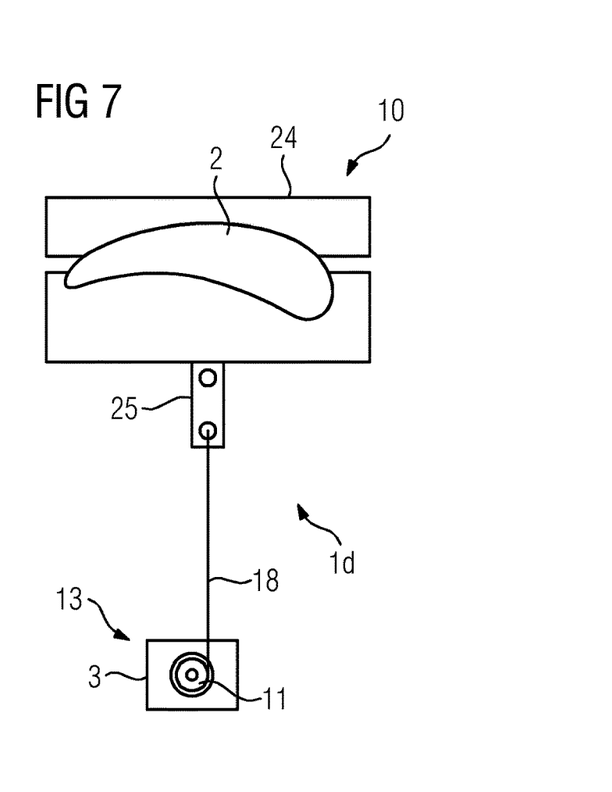
FIG. 7 shows a fourth embodiment of an exciter device.

FIG. 7 shows a fourth embodiment of an exciter device 1d according to the current invention. In this embodiment, which uses the wooden yoke 24, the motor 3 itself forms part of the pretensioning device 13, since it provides the pretension itself as an electrical torque, in particular controlled by the control device 4. This embodiment of the pretensioning device 13 may also be combined with other concrete realizations of the pretensioning device 13; Additionally, instead of the wooded yoke 24, also other transfer devices 10 may be used, for example the sling 27.

Figure 8:
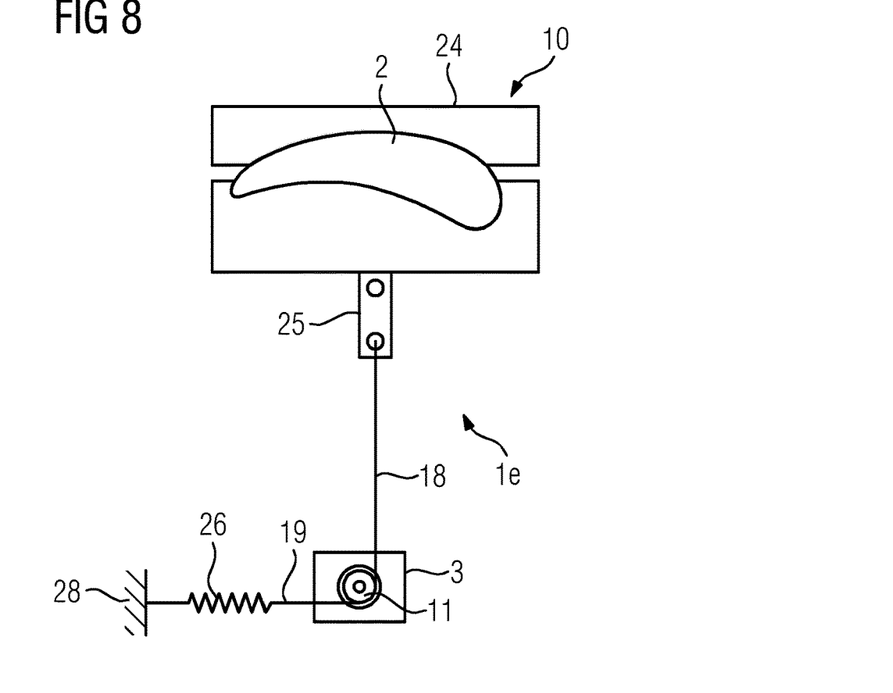
FIG. 8 shows a fifth embodiment of an exciter device.

A further, fifth embodiment of an exciter device 1e according to the invention is shown in FIG. 8. In this variant, the spring 26 uses a concrete block 28 as a counter-bearing to provide the pretension.

Figure 9:
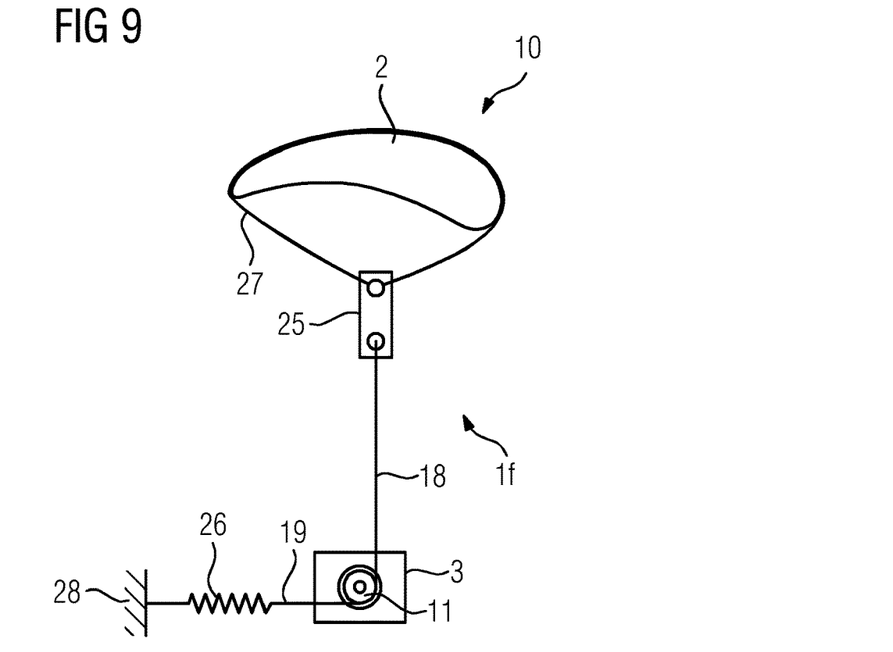
FIG. 9 shows a sixth embodiment of an exciter device.

As the sixth embodiment of an exciter device if according to the invention in FIG. 9 shows, again, also a sling 27 may be used as part of the transfer device 10.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The claims are as follows:

1. An exciter device for fatigue testing of a blade of a wind turbine, comprising:
    an actuator for generating a periodic excitation force;
    a coupling device for coupling the actuator to a blade to be tested; and
    a pretensioning device applying a pretension such that the periodic excitation force only acts in a pulling or pushing direction over a whole period.

2. The exciter device according to claim 1, further comprising a control device, the control device being configured to control the actuator to generate the periodic excitation force for the blade having a predetermined frequency calculated from an eigenfrequency of the blade and/or depending on a coupling point of the blade.

3. The exciter device according to claim 1, wherein the coupling device comprises a gearbox.

4. The exciter device according to claim 1, wherein the coupling device comprises:
    a transfer device for mounting to the blade to transfer the periodic excitation force to the blade,
    a pulley mounted to an actuator shaft of the actuator, and
    a flexible coupling element for coupling the pulley to the transfer device, the pulley being configured to wind the wire to transfer the periodic excitation force,
    wherein the coupling element is pretensioned by the pretensioning device.

5. The exciter device according to claim 4, wherein the actuator is a three-phase induction motor and/or the coupling element comprises a steel wire, a rope, a belt, or a fiber.

6. The exciter device according to claim 4, wherein the pretensioning device comprises a spring or a mass or piston, wherein the pretension is applied by using a flexible pretensioning element fixed to the pulley.

7. The exciter device according to claim 6, wherein the spring is attached to the pretensioning element and a counter-bearing or that a freely suspended mass is attached to the pretensioning element.

8. The exciter device according to claim 7, wherein the counter-bearing comprises the coupling element and/or an attachment means for the coupling element and/or the transfer device is used as the counter-bearing.

9. The exciter device according to claim 4, wherein the pretensioning device comprises the actuator applying at least a part of the pretension, using the control device to accordingly control the actuator.

10. The exciter device according to claim 4, wherein the transfer device comprises a yoke and/or a sling to be slung around the blade.

11. The exciter device according to claim 4, wherein the coupling element is attached to the transfer device by an attachment means, comprising at least one through-hole for fixing the coupling element.

12. The exciter device according to claim 11, wherein if the transfer device comprises a sling, the attachment means comprises an additional through-hole for the sling.

13. The exciter device according to claim 1, wherein it comprises a load cell connected to the control device.

14. A method for fatigue testing of a blade of a wind turbine, wherein a periodic excitation force is generated by an actuator, and applied to the blade by a coupling device for coupling the actuator to the blade, wherein a pretension is applied to the blade such that the periodic excitation force only acts in a pulling or pushing direction over a whole period.

15. The method according to claim 14, wherein an exciter device is used for the fatigue testing of the blade.

\* \* \* \* \*